United States Patent
Sethi et al.

(10) Patent No.: US 11,989,098 B2
(45) Date of Patent: May 21, 2024

(54) METHOD AND APPARATUS FOR DETECTING PRE-ARRIVAL OF DEVICE OR COMPONENT FAILURE

(71) Applicant: Dell Products L.P., Round Rock, TX (US)

(72) Inventors: Parminder Singh Sethi, Punjab (IN); Lakshmi S. Nalam, Bangalore (IN); Atishay Jain, Meerut (IN)

(73) Assignee: Dell Products L.P., Round Rock, TX (US)

( * ) Notice: Subject to any disclaimer, the term of this patent is extended or adjusted under 35 U.S.C. 154(b) by 83 days.

(21) Appl. No.: 17/660,236

(22) Filed: Apr. 22, 2022

(65) Prior Publication Data

US 2023/0342258 A1   Oct. 26, 2023

(51) Int. Cl.
*G06F 3/06* (2006.01)
*G06F 11/14* (2006.01)
*G06F 11/20* (2006.01)
*G06F 16/27* (2019.01)

(52) U.S. Cl.
CPC ........ *G06F 11/1458* (2013.01); *G06F 3/0619* (2013.01); *G06F 3/0653* (2013.01); *G06F 11/1407* (2013.01); *G06F 11/2056* (2013.01); *G06F 16/27* (2019.01)

(58) Field of Classification Search
CPC .... G06F 3/0619; G06F 3/0653; G06F 9/4856; G06F 9/45558; G06F 2009/4557; G06F 11/203; G06F 2201/84; G06F 11/1471; G06F 3/0647
See application file for complete search history.

(56) References Cited

U.S. PATENT DOCUMENTS

| | | | | |
|---|---|---|---|---|
| 2006/0184587 | A1* | 8/2006 | Federwisch | H04L 67/1097 |
| 2011/0321041 | A1* | 12/2011 | Bhat | G06F 9/45558 714/21 |
| 2012/0030346 | A1* | 2/2012 | Fukuda | G06F 11/0709 709/224 |
| 2016/0034362 | A1* | 2/2016 | Al-Wahabi | G06F 11/1471 714/4.1 |
| 2017/0315838 | A1* | 11/2017 | Nidugala | H04L 43/0817 |
| 2018/0060102 | A1* | 3/2018 | Zhu | G06F 9/45533 |
| 2021/0004262 | A1* | 1/2021 | Gupta | G06F 9/45558 |
| 2022/0214903 | A1* | 7/2022 | Zhao | G06N 20/00 |

* cited by examiner

*Primary Examiner* — Jane W Benner
(74) *Attorney, Agent, or Firm* — DALY, CROWLEY, MOFFORD & DURKEE, LLP

(57) ABSTRACT

A method including: initiating a migration of data from a source system to a destination system, the migration of data being configured to proceed based on a checkpoint set that includes a plurality of checkpoints; detecting whether any of the checkpoints in the checkpoint set is reached; obtaining a health score for the source system, the health score being obtained in response to any of the checkpoints being reached; if the health score satisfies a condition, executing an action to prevent a loss of data that is being migrated; and if the health score does not satisfy the condition, abstaining from executing the action to prevent the loss of data.

17 Claims, 11 Drawing Sheets

21:05:07 | sport[5890]: | [splice/oob.ERR] | OOB Splice connection closed with error Connection timed out 21:14:11 | sport[5890]: | [io/outer/prod.ERR] | Err while reading Connection timed out

21:05:07  sport[5890]   [splice/oob.ERR]    OOB Splice connection Connection timed out 21:14:11  sport[5890]   [io/outer/prod.ERR]  Connection timed out

```
Policy:
{
  "environments": [
    {                                    ← 852
      "environment":"source system 110",
      "degradationRate":"-10",
      "interval":"5%"
    },                                   ← 854
    {
      "environment":"xyz",
      "degradationRate":"+5",
      "interval":"9%"
    }
  ]
}
```

FIG. 8C

METHOD AND APPARATUS FOR DETECTING PRE-ARRIVAL OF DEVICE OR COMPONENT FAILURE

BACKGROUND

In enterprise storage systems, the migration of data from one storage environment to another is a very complex and crucial process. As storage technology keeps evolving, after a certain amount of time, the data from one storage environment is transferred to a newer and more efficient environment. When data needs to be transferred from one storage environment to another, it is of paramount significance to prevent the loss of data during the migration.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

According to aspects of the disclosure, a method is provided comprising: initiating a migration of data from a source system to a destination system, the migration of data being configured to proceed based on a checkpoint set that includes a plurality of checkpoints; detecting whether any of the checkpoints in the checkpoint set is reached; obtaining a health score for the source system, the health score being obtained in response to any of the checkpoints being reached; if the health score satisfies a condition, executing an action to prevent a loss of data that is being migrated; and if the health score does not satisfy the condition, abstaining from executing the action to prevent the loss of data.

According to aspects of the disclosure, a system is provided, comprising: a memory; and at least one processor operatively coupled to the memory, the at least one processor being configured to perform the operations of: initiating a migration of data from a source system to a destination system, the migration of data being configured to proceed based on a checkpoint set that includes a plurality of checkpoints; detecting whether any of the checkpoints in the checkpoint set is reached; obtaining a health score for the source system, the health score being obtained in response to any of the checkpoints being reached; if the health score satisfies a condition, executing an action to prevent a loss of data that is being migrated; and if the health score does not satisfy the condition, abstaining from executing the action to prevent the loss of data.

According to aspects of the disclosure, a method is provided, comprising: initiating a migration of data from a source system to a destination system; obtaining a health score for the source system, the health score being obtained in response to a hardware alert being generated by the source system; if the health score satisfies a condition, executing an action to prevent a loss of data that is being migrated; and if the health score does not satisfy the condition, abstaining from executing the action to prevent the loss of data.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 8A is a diagram of a raw system log, according to aspects of the disclosure;

FIG. 8B is a diagram of a normalized system log, according to aspects of the disclosure;

FIG. 8C is a diagram of a policy record, according to aspects of the disclosure;

DETAILED DESCRIPTION

Figure 1:
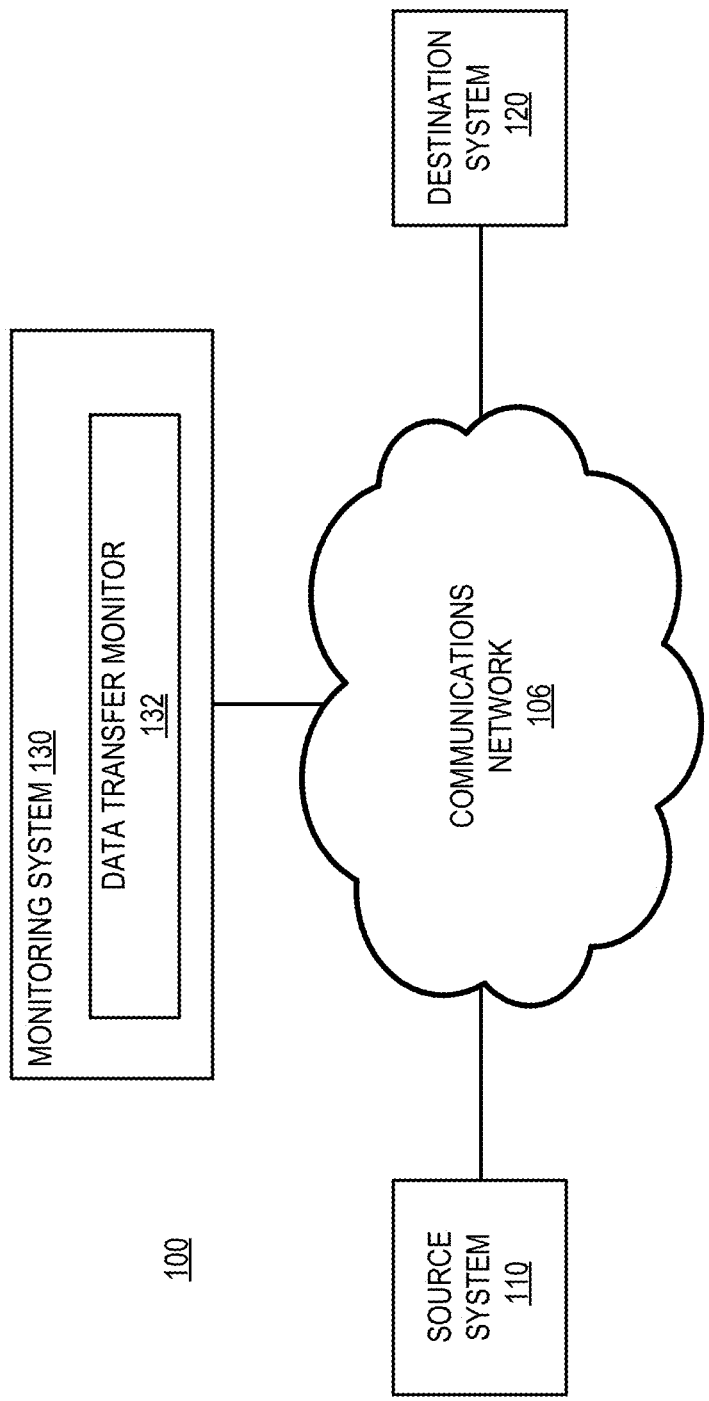
FIG. 1 is a diagram of an example of a system, according to aspects of the disclosure.

FIG. 1 is a diagram of an example of a system 100, according to aspects of the disclosure. As illustrated, the system 100 may include a source system 110, a destination system 120, and a monitoring system 130, which are connected via a communications network 106. The communications network 106 may include one or more of a local area network (LAN), a wide area network (WAN), a cellular network (e.g., a 5G network), the Public Switched Telephone Network (PTSN), the Internet, and/or any other suitable type of communications network. The source system 110 may include one or more computing devices, such as the computing device 1200, which is discussed above with respect to FIG. 12. According to the present example, the source system 110 is a data storage system. However, alternative implementations are possible in which the source system 110 includes another computing device or system, such as a desktop computer, a laptop computer, a smartphone, etc. The destination system 120 may include one or more computing devices, such as the computing device 1200, which is discussed above with respect to FIG. 12. According to the present example, the source system 110 is a data storage system. However, alternative implementations are possible in which the destination system includes another computing device or system, such as a desktop computer, a laptop computer, a smartphone, etc.

The monitoring system 130 may be configured to execute a data transfer monitor 132. The data transfer monitor 132 may include one or more processes or software applications for monitoring the transfer of data from the source system 110 to the destination system 120. Although in the example of FIG. 1 the data transfer monitor 132 is implemented in software, alternative implementations are possible in which the data transfer monitor 132 is implemented in hardware or as a combination of software and hardware. Although in the example of FIG. 1 monitor 132 is implemented on monitoring system 130, alternative implementations are possible in which monitor 132 is executed on the source system 110 and/or the destination system 120.

Figure 2:
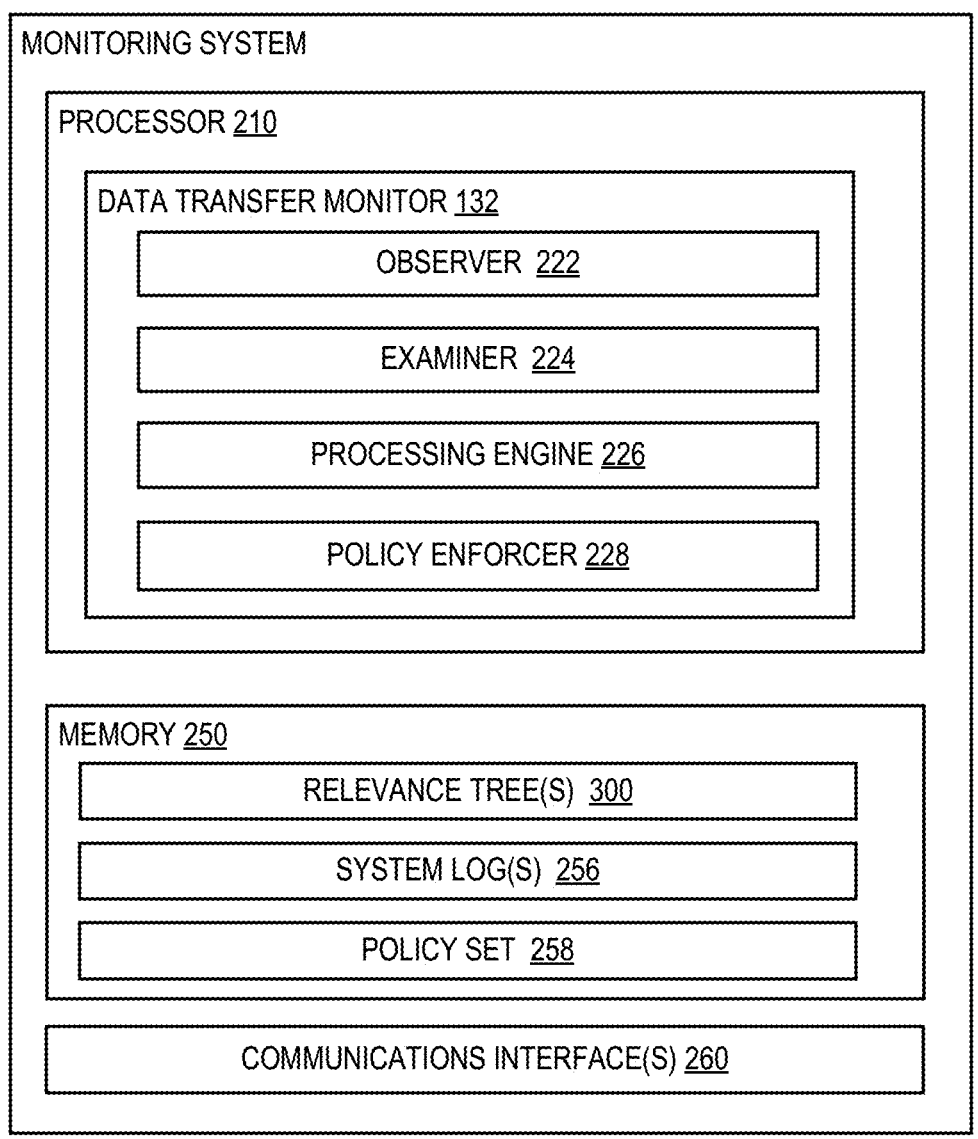
FIG. 2 is a diagram of a monitoring system, according to aspects of the disclosure.

FIG. 2 is a diagram of the monitoring system 130, according to aspects of the disclosure. The monitoring system 130 may include a processor 210, a memory 250, and a communications interface 260. The processor 210 may include any of one or more general-purpose processors (e.g., x86 processors, RISC processors, ARM-based processors, etc.), one or more Field Programmable Gate Arrays (FPGAs), one or more application-specific circuits (ASICs), and/or any other suitable type of processing circuitry. The memory 250 may include any suitable type of volatile and/or non-volatile memory. In some implementations, the memory 250 may include one or more of a random-access memory (RAM), a dynamic random memory (DRAM), a flash memory, a hard drive (HD), a solid-state drive (SSD), a network accessible storage (NAS), and or any other suitable type of memory device. The communications interface 260 may include any suitable type of communications interface, such as one or more Ethernet adapters, one or more Wi-Fi adapters (e.g., 802.1414 adapters), and one or more Long-Term Evolution (LTE) adapters, for example.

The processor 210 may execute monitor 132, as shown. Monitor 132 may include an observer 222, an examiner 224, a processing engine 226, and a policy enforcer 228. The operation of monitor 132 is discussed further below with respect to FIG. 7. The memory 250 may store one or more relevance trees 300, one or more system logs 256, and a set of policies 258. Each of the relevance trees 300 may identify a respective component of the source system 110 as well as other components of the source system 110 whose operational state is affected by the state of the respective component of the source system 110. An example of a relevance tree is discussed further below with respect to FIG. 3. Each of the system logs 256 may include telemetry data that is reported by (or otherwise associated with) any of the components of the source system 110. For example, a system log 256 may identify the speed of a fan or the temperature at the fan. As another example, a system log 256 may identify the temperature of a central processing unit (CPU) or a graphics processing unit (GPU) of the source system 110. As another example, a system log 256 may identify the temperature of a power supply unit (PSU) of the source system 110. As yet another example, a system log 256 may identify the voltage that is output on each of the rails of the PSU. As yet another example, a system log 256 may include telemetry data that is reported by a solid-state drive (SSD) or a hard drive (HD). Such telemetry data may include read error rate, CRCError count, CommandTimeout, ECCERate, and/or any other suitable type of telemetry data. Stated succinctly, the present disclosure is not limited to the system logs 256 including any specific type of telemetry data. As used herein, the term "telemetry data" may refer to any information concerning the operation of a system component that is present in a system log or otherwise reported by a computing system, and it may cover metrics, such as network speed, network throughput, read/write rate, error rate, in addition to data that is reported by various sensors that are embedded in the components of the system. Throughout the disclosure, the terms "telemetry data" and "system log" may be used interchangeably.

Figure 3:
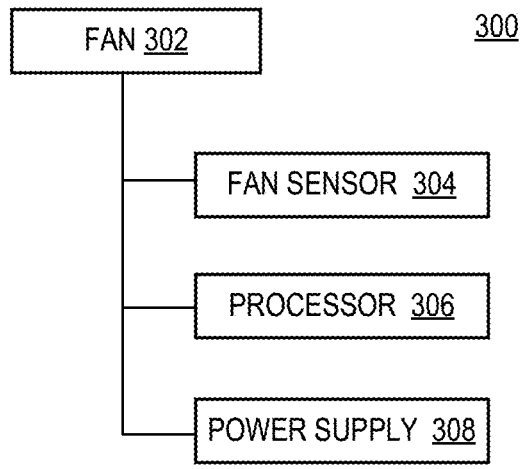
FIG. 3 is a diagram of an example of a relevance tree, according to aspects of the disclosure.

FIG. 3 is a diagram of an example of a relevance tree 300, according to aspects of the disclosure. As illustrated, the relevance tree includes a root node 302, and child nodes 304-308. The root node 302 is associated with a cooling fan of the source system 110. Node 304 is associated with a sensor that corresponds to the cooling fan. Node 306 is associated with the CPU of the source system 110. And node 308 is associated with the power supply unit (PSU) of the source system 110. Although in the present example the root node 302 is associated with a cooling fan, alternative implementations are possible in which another component of the source system 110 is associated with the root node 302. Under the nomenclature of the present disclosure, the component that is associated with the root node of a relevance tree is referred to as "the root component" of the root tree. Similarly, any component that is associated with a child component of the relevance tree is referred to as "a related component" of the root tree. Any of the related components of the root of the relevance tree 300 may be a component of the source system 110 that would fail (or whose operation would be otherwise affected adversely) in the event of a failure of the root component. In the example of FIG. 3, the fan sensor, the CPU, and the PSU of the source system 110 are components that might become damaged (or whose temperature may deviate from normal bounds) if the root component (i.e., the cooling fan) is damaged or stops working altogether. As is discussed further below, the relevance tree 300 may be used to select a specific (or relevant) set of telemetry data for generating a health score for the source system 110 in the event of a failure (or malfunction) of the root component of the relevance tree 300. Using the relevance tree 300 may allow the monitor 132 to use only data that is deemed relevant for the calculation of a particular health score, and avoid the use of data that is deemed not relevant. In other words, using the relevance tree is advantageous because it may increase the efficiency at which telemetry data is collected and analyzed by limiting the amount of data that needs to be processed. Although in the present example a tree data structure is used, it will be understood that the present disclosure is not limited to using any specific type of data structure. In other words, any suitable type of data structure can be used which contains at least a portion of the information that is stored in the relevance tree.

To determine the relevant components that need to be included in the relevance tree 300, the monitor 132 may use a machine learning model (e.g., a neural network or another type of classifier). The machine learning model may be executed (by the monitoring system 130) based on a data set that identifies different components in the source system 110, as well as other information about any of the components, such as physical placement of the components within the enclosure of the source system 110, mean time before failure of components, heat resistance, etc. Using the data set, the relevance tree may be built starting from the most relevant component to the last/least relevant component. For example, if a fan is the first component from which the telemetry information is collected, then the next relevant component is the fan sensors as they are physically near the fan and could be most affected by the heat resulting from the dysfunctional fan. In some implementations, to classify the other components that are relevant/non-relevant to the root component from which the telemetry information was collected, the k-nearest neighbors (KNN) supervised machine learning algorithm may be used. When an outcome is required for a new data instance, the KNN algorithm may go through the entire data set (placing of components within devices, mean time before failure of components, heat resistance, etc.) to find the k-nearest instances to the new instance, or the k number of instances most like the new instance, and then output the mode (or class) for this classification. The "new instance" may be a vector (or another representation) of a given component of the system 110 which would become a root component of a relevance tree. The k-nearest instances may be vectors (or other representations) of components of the source system 110, which would become child components of the relevance tree. The value of k may be user-specified. The similarity between instances may be calculated using Hamming distance. After the components have been classified and their proximal distances calculated, a relevance tree may be instantiated to capture the hierarchy of relevance.

As noted above, in some implementations, the relevance tree 300 may identify the relevance of each of the child components of the relevance tree 300 to the root component of the relevance tree 300. Under the nomenclature of the present disclosure, the more relevant a given component is to the root component of a relevance tree, the more likely for a malfunction in the root component to cause a malfunction in the given component. In the example of FIG. 3, the component associated with child node 304 is the most relevant one among the components identified by child nodes 304-308, the component associated with child node 306 is the second most relevant component, and the component associated with child node 308 is the third most relevant component.

Figure 4:
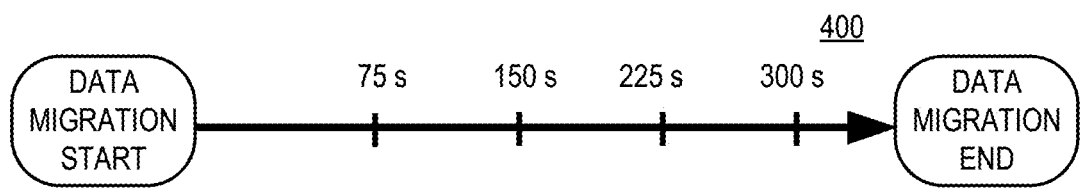
FIG. 4 is a diagram of an example of a checkpoint set, according to aspects of the disclosure.
Figure 5:
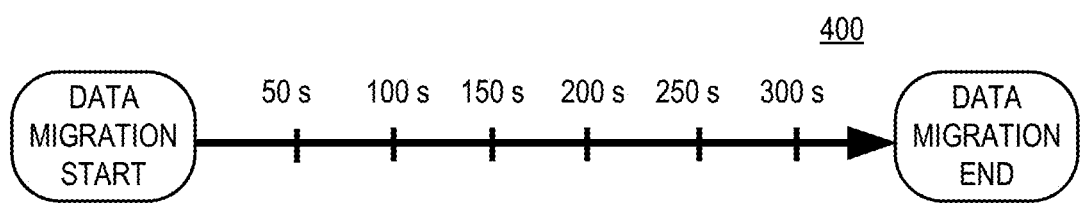
FIG. 5 is a diagram of an example of a checkpoint set, according to aspects of the disclosure.

FIG. 4 is a diagram of a set 400 of checkpoints, which is associated with a migration (or transfer) of data from the source system 110 to the destination system 120. The set 400 may specify the times when the state of the source system 110 would be assessed or reassessed to confirm that the system is healthy enough for the transfer of data to be completed successfully. The assessments of system health may give monitor 132 the opportunity to terminate the transfer of data gracefully, and prevent data loss which might otherwise occur if the source system crashes and the transfer of data is stopped abruptly. In the example of FIG. 4, the checkpoints in the set 400 are spaced apart by 75 seconds. FIG. 5 shows the set 400 after the frequency of checkpoints in the set 400 has been increased. Increasing the frequency of checkpoints in the set 400 may include adding new checkpoints to the set 400 and/or replacing existing checkpoints in the set 400 with new checkpoints. Similarly, reducing the frequency of checkpoints in the set 400 may include removing checkpoints from the set 400 or replacing existing checkpoints in the set 400 with new checkpoints. The set of checkpoints 400 may be represented by a single variable that specifies the time interval between checkpoints or by a plurality of data items, where each data item identifies a different checkpoint. Stated succinctly, the present disclosure is not limited to any specific method for representing or updating a set of checkpoints.

Figure 6A:
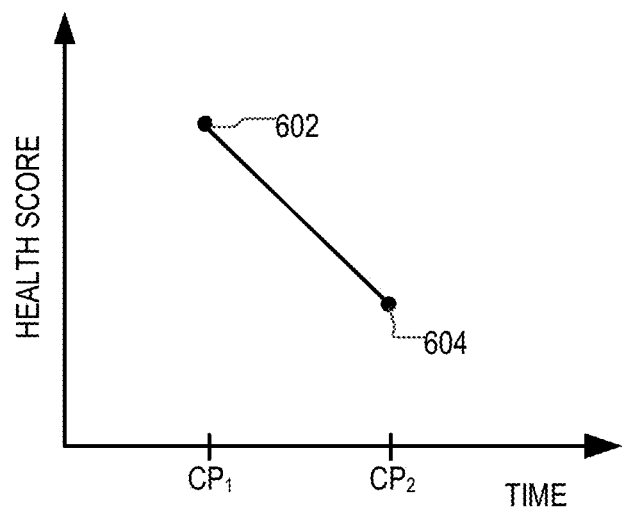
FIG. 6A is a diagram of a degradation rate of the health of a source system, according to aspects of the disclosure.

FIG. 6A is a plot of a health score of the source system 110 over time. The plot illustrates the value of the health score at different checkpoints during the migration of data from the source system 110 to the destination system 120. Specifically, the plot illustrates the value 602 of the health score of the source system 110, which is calculated when a first checkpoint (i.e., checkpoint $CP_1$) is reached. The plot further illustrates the value 604 of the health score of the source system when a second checkpoint (i.e., checkpoint $CP_2$) is reached. In the present example, checkpoint $CP_2$ immediately follows checkpoint $CP_1$ in a set of checkpoints that are used as a basis for the data migration. Although in the example of FIG. 6A the health score value 604 is generated when checkpoint $CP_2$ is reached, alternative implementations are possible in which the health score value 604 is generated when a hardware alert event is generated in the source system 110. In other words, the generation of health scores may be driven by the reaching of checkpoints in the set of checkpoints and/or the generation of hardware alert events. A "health score" may include any number, string, or alphanumerical string that is indicative of an aspect of the health of the source system 110 (or another system). At any given time, multiple health scores may be calculated for the source system 110 based on different sets of telemetry data.

Figure 6B:
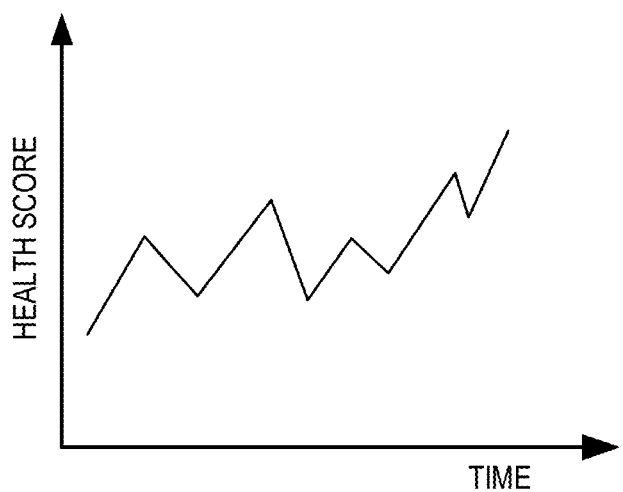
FIG. 6B is a diagram of a degradation rate of the health of a source system, according to aspects of the disclosure.

FIG. 6A is provided to illustrate that different checkpoints can be configured to calculate the rate of degradation of the source system 110. The rate of degradation of the source system 110 may be the rate at which the health of the source system 110 is deteriorating or improving. The rate of degradation of the source system 110 may be calculated based on at least two different health scores for the source system 110 that are calculated at different time instants. The rate of degradation may be the slope of the health score curve. FIG. 6B illustrates a plot of the health score of the source system 110 over a longer period, which includes at least several checkpoints.

For ease of explanation, under the nomenclature of the present disclosure, a positive rate of degradation is indicative of the health of the source system 110 improving, and a negative rate of degradation is indicative of the health of the source system 110 declining. However, it will be understood that alternative implementations are possible in which this relationship is inverted. In the present example, the value a health score for the source system 110 is directly proportional to the health of the source system 110. However, alternative implementations are possible in which the value of the health score is inversely proportional to the health of the source system 110.

Figure 7:
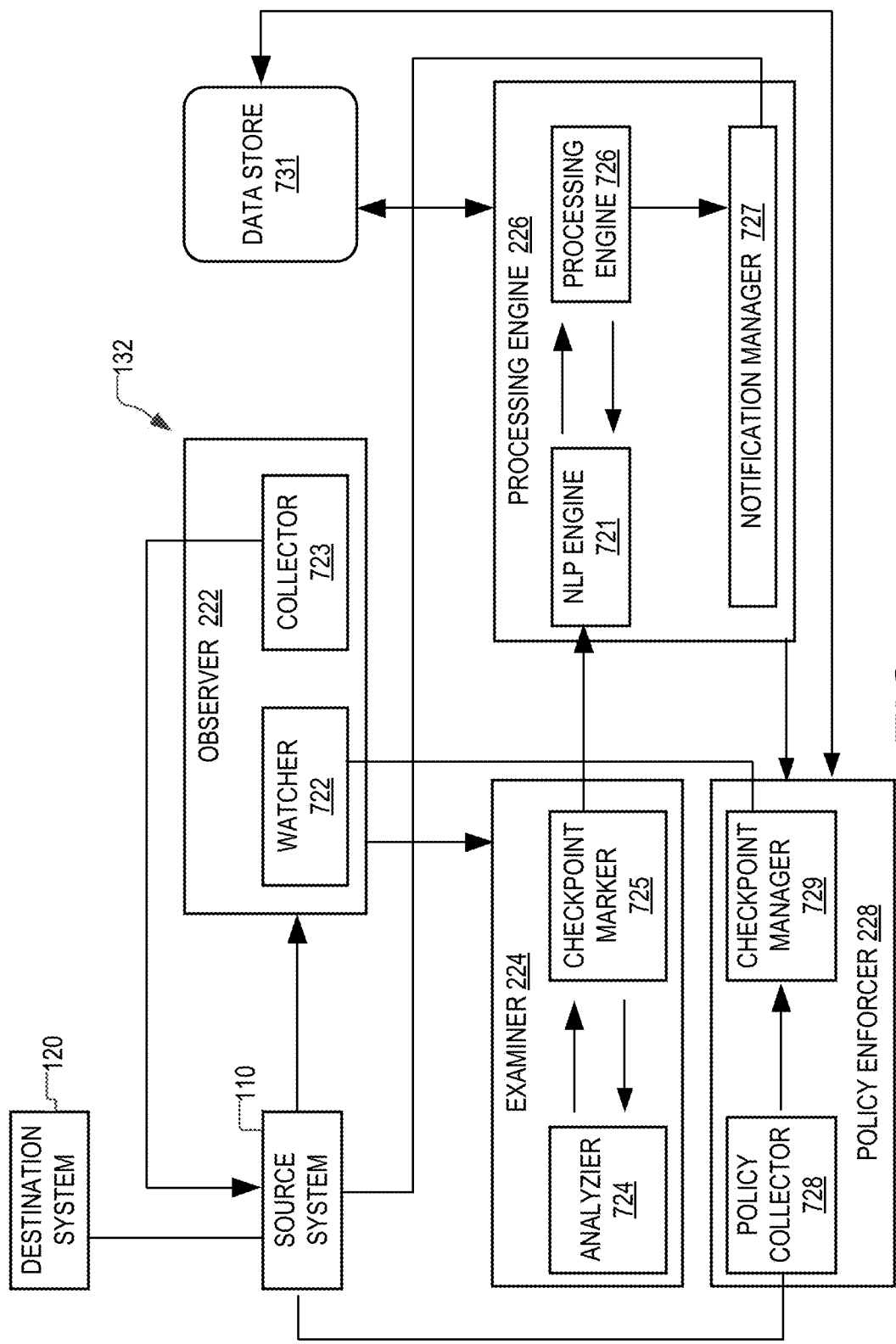
FIG. 7 is a diagram of an example of a process, according to aspects of the disclosure.

FIG. 7 is a diagram illustrating the operation of monitor 132 in further detail. As noted above, the monitor 132 may be configured to monitor a migration of data from the source system 110 to the destination system 120. The migration of data may be performed based on a set of checkpoints. The set of checkpoints may drive the performance of health checks on the source system 110. The health checks may be performed by the monitor 132. As noted above, the health checks may be performed to prevent data loss.

The observer 222 may monitor the migration activity and retrieve telemetry data when any of the checkpoints in the set is reached (or optionally when a hardware alert is generated by the source system 110). The observer 222 may include two sub-components: a watcher 722 and a collector 723. The watcher sub-component 722 may track the migration of data. Whenever the migration of data reaches an already-set checkpoint or if a hardware alert is received from the source system 110, the watcher 722 may notify the collector 723. Upon receiving the notification, the collector 723 may trigger the collection of telemetry data from relevant components of the source system 110.

A telemetry data frame that is collected by the collector 723 may be forwarded to the examiner 224 for initial analysis. The examiner 224 may include two sub-components: an analyzer 724 and a checkpoint marker 725. The analyzer 724 may perform an analysis of the migration activity. As part of the analysis, various system environment variables (like network speed, amount of data, the file system used, compatibility of systems, etc.) may be extracted from the telemetry data frame provided by the collector 723. Based on these variables, the remaining time for the migration of data is calculated. The remaining time may be proportional to equation 1 below:

$$RT \propto \left(\frac{DS}{NS}\right) + A1 + A2 \quad (1)$$

where DS is the size of the data that remains to be migrated, NS is network speed, A1 is the time required to prepare the remaining data for migration (e.g., time to load the data into a cache), and A2 is the time it takes to perform any additional processing on the data. Such additional processing may include reformatting the data from a first format that is compatible with the source system 110 to a second format that is compatible with the destination system 120. It will be understood that the present disclosure is not limited to any specific method for calculating the remaining time of a data transfer. In some implementations, the remaining time may be determined based on information (e.g., network speed information, storage device read rate, etc.) contained in the current frame of telemetry data (e.g., the set of telemetry data that is collected at the most recent checkpoint or hardware alert). Additionally or alternatively, in some implementations, the remaining time may be determined based on the current frame of telemetry data as well as at least one past frame of telemetry data (e.g., a frame of telemetry data that is collected at a previous checkpoint or hardware alert event).

The checkpoint marker 725 may generate the set of checkpoints that are used to drive the performance of health checks on the source system 110. In addition, the checkpoint marker 725 may determine the exact time at which each of the checkpoints would be reached. For example, if the estimated time for completing the data transfer is 200 seconds, then degradation checkpoints can be set up at every 50 checkpoints, which would result in 4 new checkpoints being set up. For each of the checkpoints, the checkpoint marker may identify the absolute time when the checkpoint would be reached. For instance, the checkpoint marker 725 may determine that the migration has started at 17:35:15 and conclude that the absolute time for the checkpoints is 17:36:05, 17:36:55, 17:37:35, and 17:38:25. In one possible implementation, the checkpoint marker 725 may provide the absolute times to the observer 222 where they would be used by the watcher 722 to trigger the collection of telemetry data by the collector 723. The present example illustrates one of many possible ways of implementing checkpoint-driven data collection. It will be understood that the present disclosure is not limited to any specific method for implementing and using the set of checkpoints.

The processing engine 226 may include three sub-components: a natural language processing (NLP) engine 721, a processing engine 726, and a notification manager 727. The telemetry data (initially obtained by the collector 723) may be provided to the processing engine 226 by the examiner 224.

The NLP engine 721 may process the telemetry data to identify significant keywords, while all other text in the telemetry data, which is deemed not significant, is deleted. In some respects, the NLP engine 721 may generate a normalized data frame as a result of processing the telemetry data provided by collector 723. An example of a normalized data frame (or portion thereof) is provided in FIGS. 8A-B. Specifically, FIG. 8A depicts an example of a system log 800 before it is normalized with the NLP engine 721, and FIG. 8B shows the system log 800 after it has been normalized by the NLP engine 721. The normalization of the system log 800 may be performed by executing the following process. First, the NLP engine 721 may perform segmentation on the system log 800. Next, the NLP engine 721 may perform tokenization on the system log 800. Next, the NLP engine 721 may perform part-of-speech toggling on the system log 800. Next, the NLP engine 721 may perform lemmatization on the system log 800. Next, the NLP engine 721 may remove stop words from the system log 800. Next, the NLP engine 721 may identify keywords and phrases in the system log 800. Next, the NLP engine 721 may perform named entity recognition and conference resolution on the system log 800 to identify words and phrases that are significant. And finally, the NLP engine 721 may remove from the system log 800 all words and phrases that are not identified as significant.

The normalized telemetry data frame (hereinafter current data frame), which is generated in response to a most recent checkpoint being reached (or a most recent hardware alert being generated), may be stored in a data store 731 by the processing engine 226. In addition, one or more prior normalized telemetry data frames (hereinafter prior data frames) may be retrieved from the data store 731 by the processing data frame. Each of the prior data frames may be generated in response to a different previous checkpoint being reached or in response to a previous hardware alert). The data store 731 may include a portion of the memory 250 (shown in FIG. 2).

The processing engine 726 may generate a health score curve based on the current data frame and the one or more prior data frames. The health score curve may be the same or similar to the curves shown in FIGS. 6A-B. Specifically, the processing engine 226 may calculate a current health score for the source system 110 based on the most recent telemetry data frame. In addition, the processing engine 226 may calculate one or more prior health scores. Each of the prior health scores may be generated on a different one of the prior data frames. Although in the present example the prior health scores are calculated anew, alternative implementations are possible in which the values of the prior health scores are retrieved from a cache (rather than being recalculated). Based on the health scores, the processing engine 726 may adjust the migration of data from the source system 110 to the destination system 120. The adjustment may be performed as discussed further below with respect to step 914 of the process 900B. (E.g., see FIG. 9B.) The adjustment may include increasing the frequency of checkpoints in the checkpoint set, decreasing the frequency of checkpoints in the checkpoint set, or pausing the migration of data.

The policy enforcer 228 may include two sub-components: a policy collector 728 and a checkpoint manager 729. The policy collector 728 may receive an instruction to update the set of checkpoints. The instruction may be received from the processing engine 226 via the notification manager 727. In response to the instruction, the policy collector 728 may either increase or decrease the frequency checkpoints in the set. In one implementation, the update may be performed based on the set of policies 258 (shown in FIGS. 2 and 8C). The set of policies 258 may include policy rules 852 and 854. According to the present example, rule 852 provides that when the degradation rate of the source system 110 is greater than or equal to −10, the period between each of the checkpoints in the set should be equal to 5% of the remaining time for the data migration (or 5% the entire time it takes to perform the data migration). Rule 854 provides that when the degradation rate of the source system 110 is less than or equal to 5, the period between each of the checkpoints in the set should be equal to 9% of the remaining time for the data migration (or 9% the entire time it takes to perform the data migration). In other words, rules 852 and 852 illustrate that the better the health of the source system 110, the longer the time between different checkpoints.

The checkpoint manager 729 may receive the updated set of checkpoints and re-configure the observer 222 based on the updated set of checkpoints. Reconfiguring the observer 222 may include any action that would cause (directly or indirectly) the observer 222 to collect telemetry data when a checkpoint in the updated set is reached. For example, in some implementations, the checkpoint manager 729 may provide the updated set of checkpoints to the checkpoint marker 725, which may then calculate the absolute times for the checkpoints in the updated set, and provide the absolute times to the observer 222, where they can be used to drive the collection of telemetry data by the collector 723. It will be understood that the present disclosure is not limited to any specific method for configuring the observer 222 to operate based on the updated set of checkpoints.

Figure 9A:
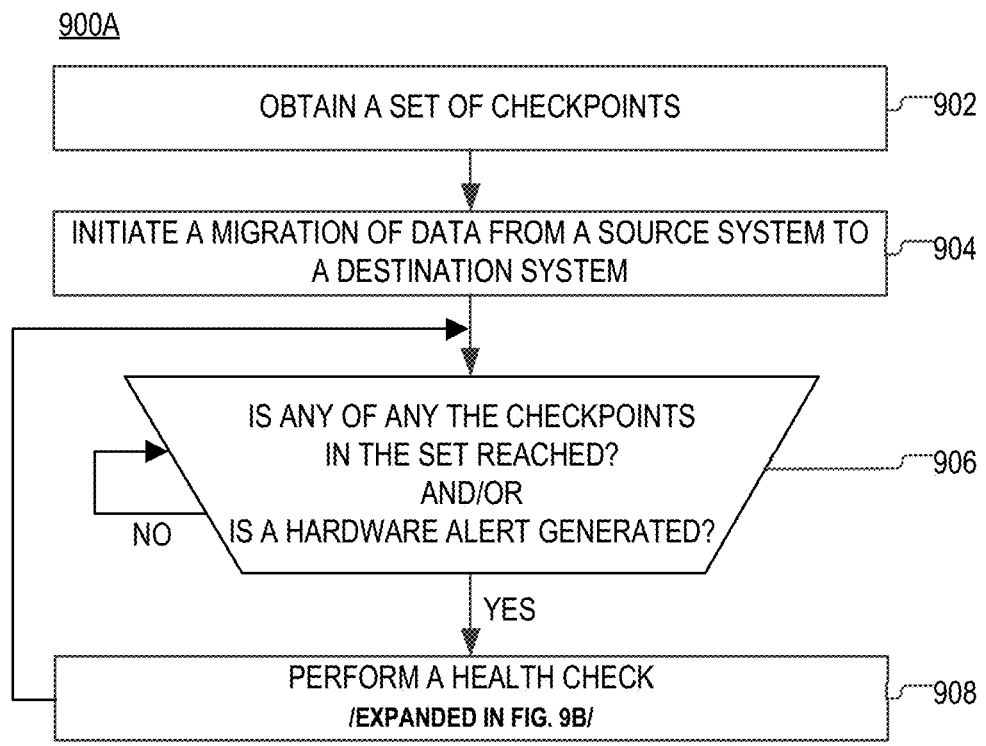
FIG. 9A is a flowchart of an example of a process, according to aspects of the disclosure.

FIG. 9A is a flowchart of an example of a process 900A, according to aspects of the disclosure. At step 902, the monitor 132 obtains a set of checkpoints. The set of checkpoints may be the same or similar to the set 400, which is shown in FIG. 4. At step 904, a migration (or transfer) of data from the source system 110 to the destination system 120 is started. At step 906, the monitor 132 detects: (i) whether any of the checkpoints in the set (obtained at step 902) is reached and/or (ii) whether a hardware alert is generated for a component in the source system 110. If a checkpoint has been reached or hardware alert generated, the process 900A proceeds to step 908. Otherwise, step 906 is repeated. At step 908, the monitor 132 performs a health check of the source system 110.

Figure 9B:
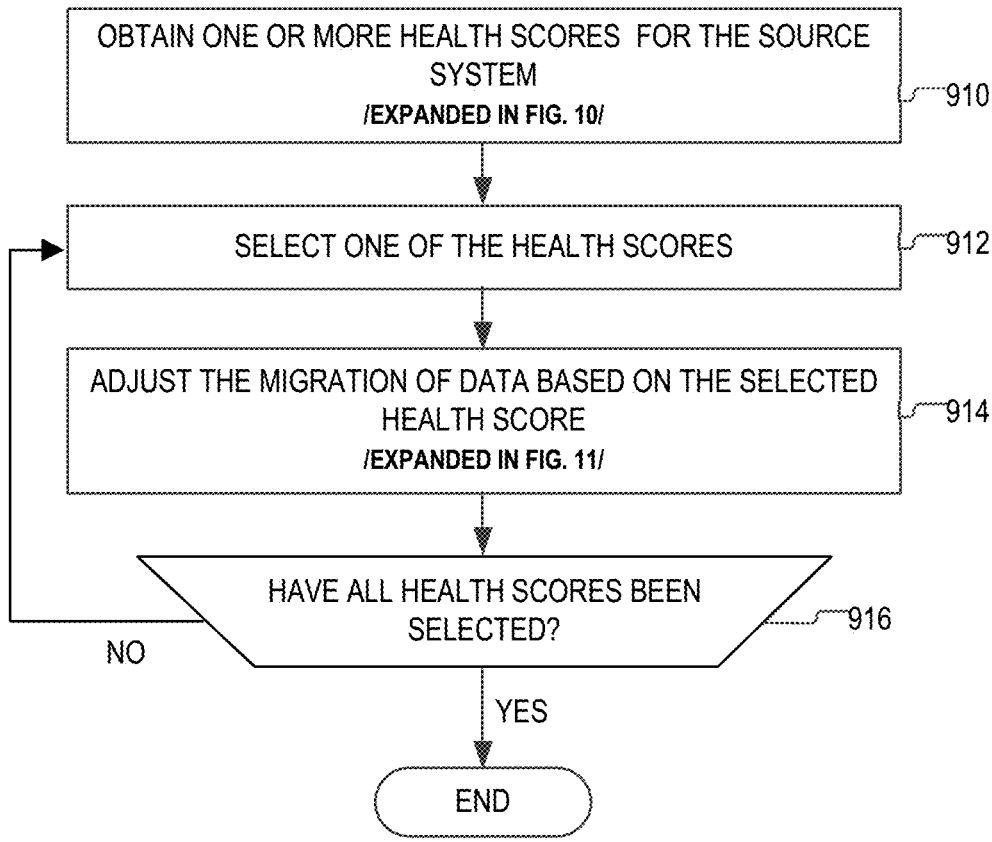
FIG. 9B is a flowchart of an example of a process, according to aspects of the disclosure.

FIG. 9B is an example of a process 900B for performing a health check on the source system 110, as specified by step 908 of the process 900A. At step 910, one or more health scores are obtained for the source system 110. In some implementations, each of the health scores may be obtained in accordance with a process 1000, which is discussed further below with respect to FIG. 10. At step 912, one of the health scores is selected. At step 914, the migration of data (initiated at step 904) is adjusted based on the selected health score. In some implementations, the adjustment may be performed in accordance with a process 1100, which is discussed further below with respect to FIG. 11. At step 916, a determination is made if each of the health scores has been selected. If all of the health scores have been selected, the process 900B ends. Otherwise, the process 900B returns to step 912, and another health score is selected (which has not been selected before).

Figure 10:
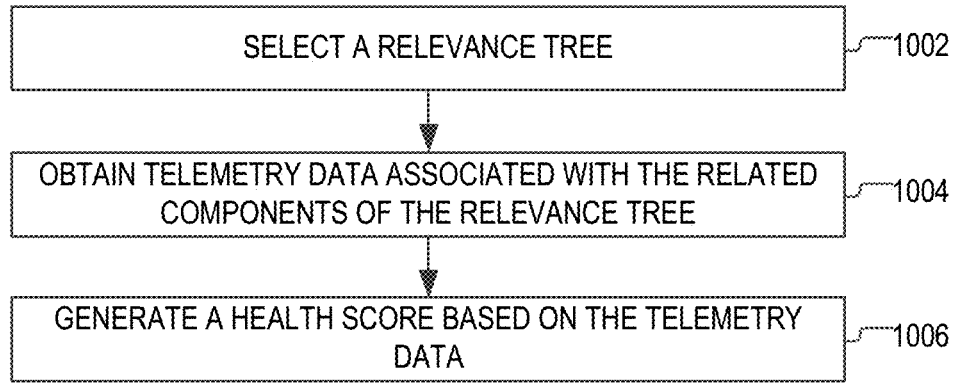
FIG. 10 is a flowchart of an example of a process, according to aspects of the disclosure.

FIG. 10 is a flowchart of an example of a process 1000 for obtaining a health score, as specified by step 910 of the process 900B, according to aspects of the disclosure.

At step 1002, the monitor 132 selects a relevance tree. When the process 1000 is executed in response to the migration of data (initiated at step 904) reaching a checkpoint, the selected relevance tree may be one that is designated for default use in the generation of a health score when a checkpoint is reached. When the process 1000 is executed in response to the detection of a hardware alert (at step 906), the selected relevance tree may be one whose root component is associated with the hardware alert. For example, if the hardware alert indicates that the CPU of the source system 110 is overheating, the selected relevance tree may be one that has the CPU as its root component. The selection may be made out of a plurality of relevance trees, where each of the relevance trees has a different root component.

At step 1004, the monitor 132 obtains telemetry data associated with the related components of the relevance tree (selected at step 1002). Specifically, for each (or at least some) of the related components and/or the root component of the relevance tree, the monitor 132 may retrieve telemetry data. The telemetry data may be generated by the source system 110, and it may identify various operational parameters of the related components and/or errors or other events that are generated over the course of operation of the related components. As noted above, the relevant components may be part of the source system 110, and the telemetry data may be retrieved from the system logs 256 or from any other location.

At step 1006, the monitor 132 generates a health score for the source system 110 based on the obtained telemetry data. In some implementations, the health score may be based on the value of a single parameter that is identified in the telemetry data. In such implementations, the health score may be based on the current CPU temperature of the source system 110 (e.g., the health score may be equal to the inverse of the CPU temperature), the current speed of a particular cooling fan of the source system, the current number of read errors that are generated when the data under migration is being retrieved from a storage device of the source system 110, etc. Additionally or alternatively, in some implementations, the health score may be generated by combining multiple parameters of the operation of the source system 110. For example, the health score may be based on a weighted sum of various parameters of the operation of a storage device (e.g., read error rate, write error rate, and a temperature of a hard drive). As another example, the health score may be based on a weighted average of the speeds of various cooling fans in the source system. Stated succinctly, the present disclosure is not limited to any specific method for calculating and/or representing health scores.

Figure 11:
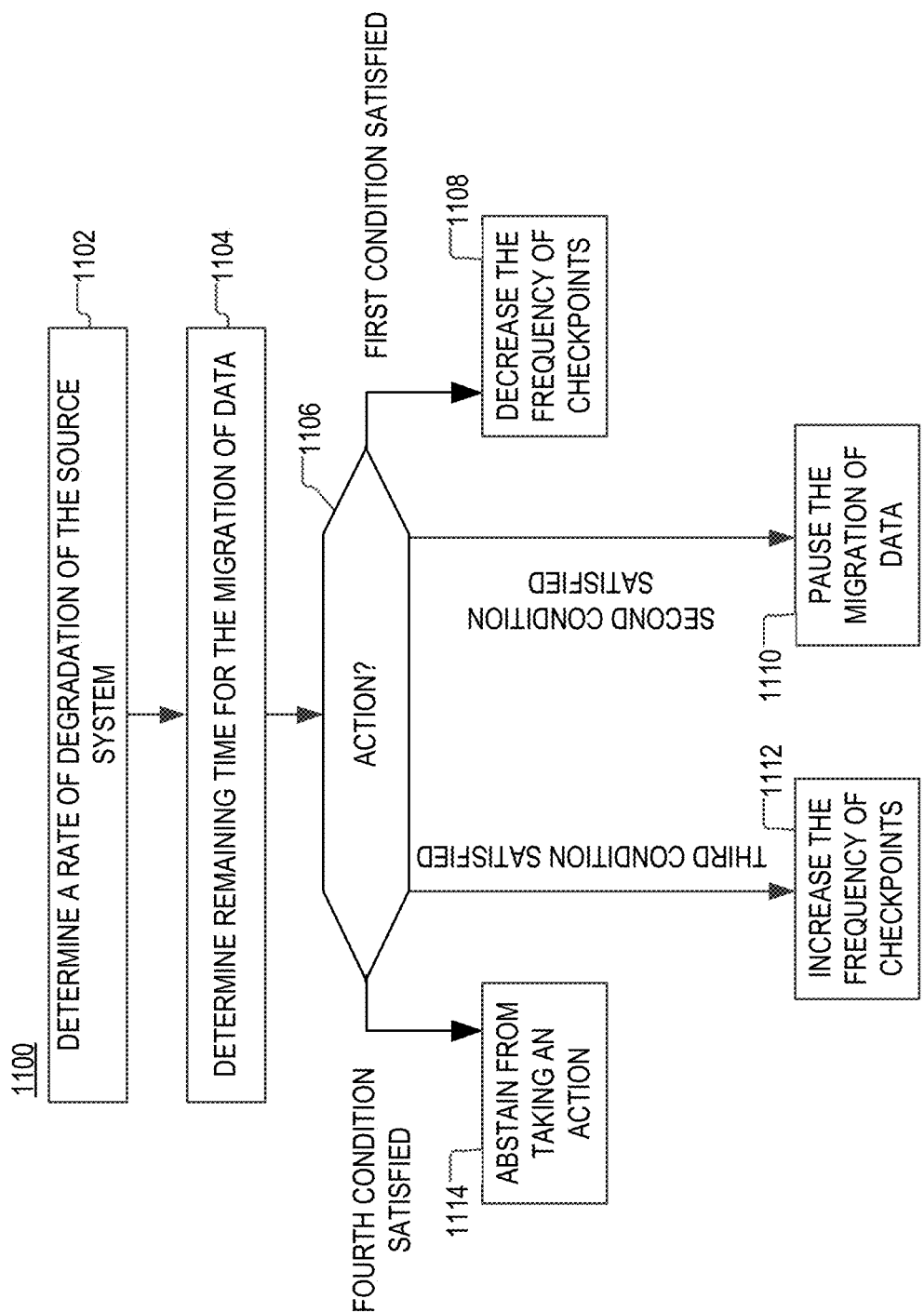
FIG. 11 is a flowchart of an example of a process, according to aspects of the disclosure.

FIG. 11 is a flowchart of an example of a process 1100 adjusting the migration of data as specified by step 914 of the process 900B.

At step 1102, the monitor 132 determines the rate of degradation of the source system 110. The rate of degradation, as noted above, may be based on the rate at which the particular health score changes over time. For example, the rate of degradation may be the difference between a most recent value of the health score and a previous value of the health score. As another example, the health score may be the average rate of change that is calculated based on more than two values of the health score, and which accounts for fluctuations of the health score in both directions, such as the fluctuations shown in FIG. 6B. Stated succinctly, the present disclosure is not limited to any specific method for calculating the rate of degradation.

At step 1104, the monitor 132 determines the remaining time for the migration of data (started at step 904).

At step 1106, at step 1106, the monitor 132 determines what action needs to be taken with respect to the migration of data, if any. In making the determination, the monitor 132 may evaluate four conditions. If the first condition is satisfied, process 1100 may proceed to step 1108. If the second condition is satisfied, process 1100 may proceed to step 1110. If a third condition is satisfied, the process 1100 may proceed to step 1112. And, if a fourth condition is satisfied, the process 1100 may proceed to step 1114.

At step 1108, the monitor 132 decreases the frequency of checkpoints in the set (obtained at step 902). The first condition, on which step 1108 is predicated, may be satisfied when the rate of degradation exceeds threshold T1. For example, the first condition may be satisfied, when the health of the source system 110 is improving and not as many checkpoints are necessary as before (when the health of the source system 110 was declining). Although the first condition is based on a rate of degradation (i.e., health score slope), alternative implementations are possible in which the first condition is based on the most recent value of the health score (rather than its slope).

At step 1110, the monitor 132 pauses the migration of data (started at step 904). The second condition, on which step 1110 is predicated, may be satisfied when the rate of degradation falls below a threshold T2. For example, if the health score is inversely proportional to CPU temperature, the second condition may be satisfied if the rate of degradation indicates that CPU temperature would exceed a critical level (i.e., a level at which the source system would crash) before the migration of data is completed. The second condition may be used to detect conditions in which the source system 110 might experience a critical failure or a crash before the migration of data is completed. Pausing the migration of data before the source system has failed may prevent data loss which would otherwise occur if the source system 110 crashes unexpectedly while the data migration is ongoing. In some implementations, the threshold T2 may be calculated based on the remaining time (obtained at step 1104). Additionally or alternatively, in some implementations, the threshold T2 may be calculated based on information that is stored in a support database. In one aspect, the second condition evaluates whether the source system 110 is at risk of experiencing a failure (e.g., a critical failure, such as a crash) before the migration of data is completed. By way of example, the source system 110 may be deemed at risk of experiencing a failure if the degradation rate of the source system 110 (e.g., the slope of the health score) indicates that the health score would cross a predetermined threshold (e.g., threshold C2) before the migration of data is finished. Although the second condition is based on a rate of degradation (i.e., health score slope), alternative implementations are possible in which the second condition is based on the most recent value of the health score (rather than its slope).

At step 1112, the monitor 132 increases the frequency of checkpoints in the set (obtained at step 902). The third condition, on which step 1112 is predicated, may be satisfied when the rate of degradation falls below a threshold T3, while remaining higher than the threshold T2. According to the present example, T2<T3<T1. For example, the third condition may be satisfied, when the health of the source system 110 is declining, but the rate of degradation indicates that the migration of data will complete before the source system experiences a critical failure. Increasing the frequency of checkpoints allows the health of the source system 110 to be monitored more closely, and increases the number of opportunities to pause the migration of data if the health of the source system 110 begins to decline at a faster rate. Although the third condition is based on a rate of degradation (i.e., health score slope), alternative implementations are possible in which the third condition is based on the most recent value of the health score (rather than its slope).

At step 1114, the monitor 132 abstains from taking an action to prevent the loss of data. The fourth condition, on which step 1114 is predicated, may be satisfied when the rate of degradation is between thresholds T1 and T3. The phrase "abstaining from taking an action to prevent the loss of data" may refer to terminating the process 1100 (or an ongoing health check) without changing the set of checkpoints or pausing the migration of data. Although the fourth condition is based on a rate of degradation (i.e., health score slope), alternative implementations are possible in which the fourth condition is based on the most recent value of the health score (rather than its slope).

In some implementations, the values of thresholds T1 and T3 may be retrieved from a support database. In addition, in some implementations, the value of threshold T2 may be calculated based on information retrieved from the support database. Such information may include a base value for the threshold T2, which is scaled up or down based on the remaining time of data migration. The support database may be stored in the memory 250 (shown in FIG. 2) or elsewhere. The support database may include a plurality of entries. Each entry may map respective values for thresholds T1-T3 to a different device model. To retrieve the values of thresholds T1-T3 for the support system 110, the monitor 132 may perform a search of the support database using the device model of the source system 110 as a search key. If no entry is available in the support database for the source system 110, the monitor 132 may use the entry for another system (hereinafter alternative system) that is sufficiently similar to the source system 110. Specifically, the monitor 132 may obtain a first vector and a second vector. The first vector may describe the hardware configuration of the source system 110. The second vector may describe the hardware configuration of the alternative system. To determine the similarity between the source system 110 and the alternative system, the monitor 132 may compute the cosine similarity between the first vector and the second vector. If the cosine similarity is above a predetermined threshold, the monitor 132 may determine that the alternative system is sufficiently similar to the source system 110. Upon making such determination, the monitor 132 may use the values of thresholds T1-T3 for the alternative system (which are stored in the support database) to decide whether an adjustment of the migration of data from the source system 110 is necessary.

Under the nomenclature of the present disclosure, steps 1110 and 1112 are examples of actions to prevent data loss. Although in the example of FIG. 11 steps 1108-1114 are performed based on the degradation rate of the source system 110 (determined at step 1102), alternative implementations are possible in which steps 1108-1114 are performed based on an individual health score. In such implementations, the first condition may be satisfied if the health score exceeds a threshold C1, the second condition would be satisfied if the health score is below a threshold C2, the third condition may be satisfied if the health score is between a threshold C3 and the threshold C2, and the fourth condition may be satisfied if the health score is between threshold C1 and C3, where C1>C3>C2. Although in the example of FIGS. 9A-B steps 1108-1114 are performed based on health scores/degradation rates for the source system 110, alternative implementations are possible in which steps 1108-1114 are performed based on health scores/degradation rates for the destination system 120. In such implementations, the health scores/degradation rates may be calculated based on telemetry data obtained from the destination system 120, and they may be obtained in response to a checkpoint being reached or in response to a hardware alert from the destination system 120. As used herein, the term "hardware alert"

refers to an alert or event that is generated when the operational parameter of a component exits normal bounds.

Figure 12:
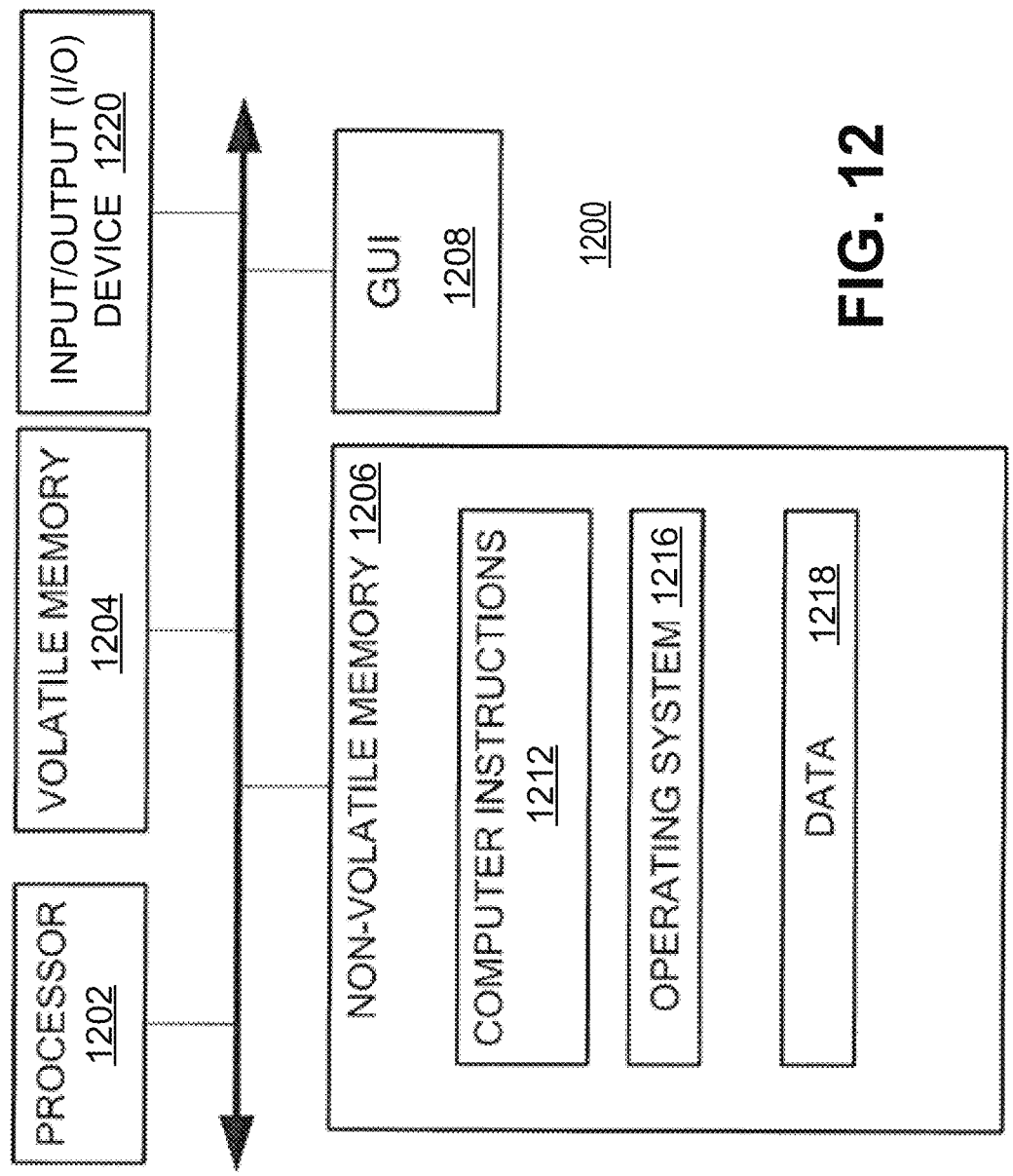
FIG. 12 is a diagram of an example of a computing device, according to aspects of the disclosure.

Referring to FIG. 12, computing device 1200 may include processor 1202, volatile memory 1204 (e.g., RAM), non-volatile memory 1206 (e.g., a hard disk drive, a solid-state drive such as a flash drive, a hybrid magnetic and solid-state drive, etc.), graphical user interface (GUI) 1208 (e.g., a touchscreen, a display, and so forth) and input/output (I/O) device 1220 (e.g., a mouse, a keyboard, etc.). Non-volatile memory 1206 stores computer instructions 1212, an operating system 1216 and data 1218 such that, for example, the computer instructions 1212 are executed by the processor 1202 out of volatile memory 1204. Program code may be applied to data entered using an input device of GUI 1208 or received from I/O device 1220.

Processor 1202 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard-coded into the electronic circuit or soft coded by way of instructions held in a memory device. A "processor" may perform the function, operation, or sequence of operations using digital values or using analog signals. In some embodiments, the "processor" can be embodied in an application-specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors or one or more "virtual" (e.g., remotely located or "cloud") processors.

The term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method comprising:
    initiating a migration of data from a source system to a destination system, the migration of data being configured to proceed based on a checkpoint set that includes a plurality of checkpoints;
    detecting whether any of the checkpoints in the checkpoint set is reached;
    obtaining a health score for the source system, the health score being obtained in response to any of the checkpoints being reached;
    determining whether a condition is satisfied by the health score, the determining being performed based on a rate of degradation of the source system, the rate of degradation being calculated based on the health score;
    in response to the health score satisfying the condition, executing an action to prevent a loss of data that is being migrated; and
    in response to the health score failing to satisfy the condition, abstaining from executing the action to prevent the loss of data.

2. The method of claim 1, wherein the action to prevent the loss of data includes increasing a frequency of checkpoints in the checkpoint set.

3. The method of claim 1, wherein the action to prevent the loss of data includes pausing the migration of data.

4. The method of claim 1, wherein the health score for the source system is based on a single telemetry data value that is reported by a component of the source system.

5. The method of claim 1, wherein the health score for the source system is based on a plurality of telemetry data values that are reported by the source system.

6. The method of claim 1, further comprising:
    calculating a remaining time for the migration of data; and
    calculating the rate of degradation of the source system based on the health score,
    wherein the condition is satisfied when the rate of degradation indicates that the source system is at risk of experiencing a failure before the migration of data is finished, and
    wherein the action to prevent the loss of data includes pausing the migration of data.

7. The method of claim 1, wherein the health score is calculated based on at least a portion of a telemetry data frame, the telemetry data frame being obtained based on a data structure that is associated with a respective component of the source system, the data structure identifying one or more other components of the source system that are at risk of failing when the respective component fails.

8. The method of claim 7, wherein the data structure includes a relevance tree.

9. A system comprising:
    a memory; and
    at least one processor operatively coupled to the memory, the at least one processor being configured to perform the operations of:
    initiating a migration of data from a source system to a destination system, the migration of data being configured to proceed based on a checkpoint set that includes a plurality of checkpoints;
    detecting whether any of the checkpoints in the checkpoint set is reached;
    obtaining a health score for the source system, the health score being obtained in response to any of the checkpoints being reached;
    determining whether a condition is satisfied by the health score, the determining being performed based on a rate of degradation of the source system, the rate of degradation being calculated based on the health score;
    in response to the health score satisfying the condition, executing an action to prevent a loss of data that is being migrated; and
    in response to the health score failing to satisfy the condition, abstaining from executing the action to prevent the loss of data.

10. The system of claim 9, wherein the action to prevent the loss of data includes increasing a frequency of checkpoints in the checkpoint set.

11. The system of claim 9, wherein the action to prevent the loss of data includes pausing the migration of data.

12. The system of claim 9, wherein the health score for the source system is based on a single telemetry data value that is reported by a component of the source system.

13. The system of claim 9, wherein the health score for the source system is based on a plurality of telemetry data values that are reported by the source system.

14. The system of claim 9, wherein:
    the at least one processor is further configured to perform the operations of calculating a remaining time for the migration of data, and calculating the rate of degradation of the source system based on the health score,
    the condition is satisfied when the rate of degradation indicates that the source system is at risk of experiencing a failure before the migration of data is finished, and
    the action to prevent the loss of data includes pausing the migration of data.

15. The system of claim 9, wherein the health score is calculated based on at least a portion of a telemetry data frame, the telemetry data frame being obtained based on a data structure that is associated with a respective component of the source system, the data structure identifying one or more other components of the source system that are at risk of failing when the respective component fails.

16. The system of claim 15, wherein the data structure includes a relevance tree.

17. A method comprising:
    initiating a migration of data from a source system to a destination system;
    obtaining a health score for the source system, the health score being obtained in response to a hardware alert being generated by the source system;
    calculating a remaining time for the migration of data; and
    calculating a rate of degradation of the source system based on the health score,
    in response to the health score satisfying a condition, executing an action to prevent a loss of data that is being migrated; and in response to the health score failing to satisfy the condition, abstaining from executing the action to prevent the loss of data, wherein the condition is satisfied when the rate of degradation indicates that the source system is at risk of experiencing a failure before the migration of data is finished, and wherein the action to prevent the loss of data includes pausing the migration of data.

* * * * *